F. ZUBER.
CUSHIONING BODY FOR CASINGS.
APPLICATION FILED OCT. 15, 1915.
1,176,511.
Patented Mar. 21, 1916.
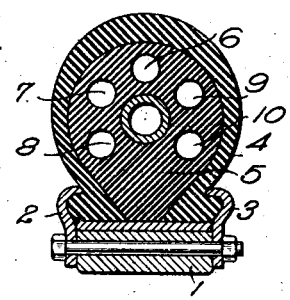
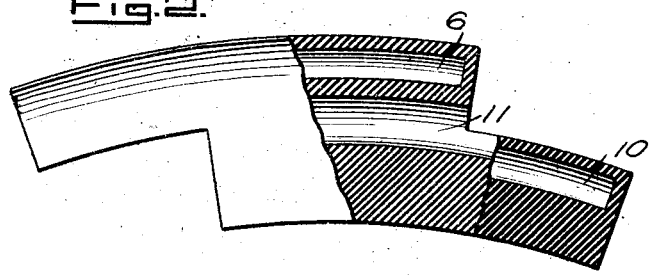
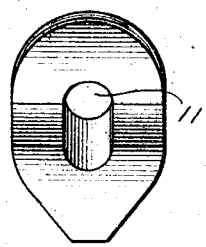
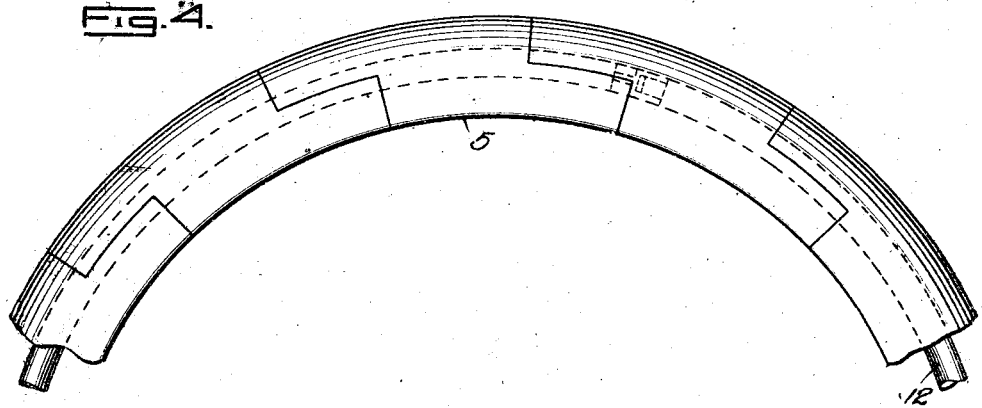
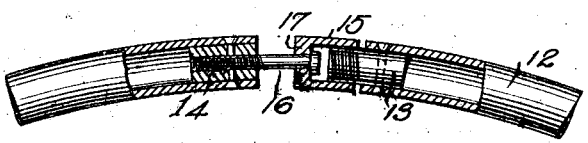
WITNESSES
INVENTOR
Francis Zuber
BY
ATTORNEYS

UNITED STATES PATENT OFFICE.

FRANCIS ZUBER, OF READING, PENNSYLVANIA.

CUSHIONING-BODY FOR CASINGS.

1,176,511.  Specification of Letters Patent.  Patented Mar. 21, 1916.

Application filed October 15, 1915. Serial No. 55,958.

*To all whom it may concern:*

Be it known that I, FRANCIS ZUBER, a citizen of the United States, and a resident of Reading, in the county of Berks and State of Pennsylvania, have invented a new and Improved Cushioning-Body for Casings, of which the following is a full, clear, and exact description.

This invention relates to cushioning bodies or fillers for tire casings and has for an object the provision of an improved construction which will produce a resilient effect while being sufficiently strong to support any reasonable load.

Another object in view is to provide a hollowed-out filling or cushioning member for producing a resilient effect without the use of compressed air.

A still further object in view is to provide a cushioning filling body for tire casings arranged in sections with means for holding the same together, whereby any part may be readily renewed without it becoming necessary to renew the entire filling body.

In the accompanying drawing: Figure 1 is a transverse section through a casing and filling body disclosing an embodiment of the invention, the same being associated with a felly and clamping rims; Fig. 2 is a side view partly in section of one section of the filling body shown in Fig. 1; Fig. 3 is an end view of the section shown in Fig. 2; Fig. 4 is a side view of part of a filling body showing how the sections are connected up, the same being shown on a reduced scale; Fig. 5 is a fragmentary longitudinal vertical section through the ends of a clamping tube showing the tension mechanism.

Referring to the accompanying drawing by numerals, 1 indicates a felly of any suitable construction, to which is clamped the tire retaining rim members 2 and 3 for holding the tire casing 4 in position. The casing 4, members 2 and 3 and also felly 1 may be of any desired construction, as the same form no part of the present invention except in combination with the filling member or cushioning member 5 arranged in casing 4. The cushioning body 5 may be formed of rubber or material having the same characteristics as rubber, and is arranged in sections as shown in Figs. 2 and 3. Each section is provided with an outer opening or chamber 6, side chambers 7, 8, 9 and 10 and a central opening 11.

As shown in Fig. 2, the chambers 6 to 10 extend from near one end of the section to the other but are not open to the atmosphere so that the air is confined, thereby assisting in producing a resilient effect when a weight is brought to bear on the casing. The aperture 11 passes entirely through each section for accommodating the clamping and retaining tube 12, which tube has a threaded member 13 riveted to one end thereof and an internally threaded member 14 riveted to the opposite end thereof. A nipple 15 is threaded on the member 13 and has a bolt 16 passed therethrough so that the head of the bolt will engage nipple 15 and the threaded part of the bolt will engage the threads of member 14. The nipple 15 is provided with one or more notches 17 for receiving the pins of a wrench whereby the nipple may be rotated to draw the ends of the pipe or tube 12 toward each other. By having the retaining tube 12 the sections of the cushioning body 5 will remain in place even if the casing 4 is removed or part of the same is torn off.

As shown in Fig. 1, the various chambers 6 to 10, inclusive, are arranged so that a light weight or pressure on the tire is taken up by the peripheral part of the cushion body in which the chamber 6 is located, while if the pressure is comparatively strong the same is taken up by the main body of the cushion member in which the remaining chambers are positioned. By the distribution of the chambers as described and shown particularly in Fig. 1, the resistance is gradually increased to a maximum so that if a slight obstruction is engaged the same may be passed over easily, as a comparatively slight pressure will cause the casing and the peripheral part of the filling body to be dented inwardly.

What I claim is:

1. In a device of the character described, the combination with a casing, of a cushion filling body therefor formed from a plurality of sections, each of said sections having a closed chamber arranged at the peripheral point thereof and a plurality of closed side chambers inward of the first mentioned chamber whereby resistance to pressure will be gradually increased, thus producing different degrees of resiliency according to the amount of pressure used, each of said sections being also formed with a central longitudinally arranged unobstructed passageway, and a single clamping member extending through the passageways of said sections for holding the sections properly in place.

2. In a device of the character described, the combination with a casing of a cushioning filling member therefor, comprising a plurality of independent sections, each of said sections having an overlapping outer portion and an overlapping inner portion, each section also having a passageway therethrough and a plurality of closed chambers substantially surrounding said passageway, some of the chambers extending into the outer overlapping portion and the remaining chambers extending into the inner overlapping portion, and a clamping member extending through the passageways in all of said sections for clamping them firmly in place.

In testimony whereof I have signed by name to this specification in the presence of two subscribing witnesses.

FRANCIS ZUBER.

Witnesses:
A. L. KITCHIN,
PHILIP D. ROLLHAUS.